(12) United States Patent
Matsuo et al.

(10) Patent No.: US 8,308,438 B2
(45) Date of Patent: Nov. 13, 2012

(54) WIND POWER GENERATOR

(75) Inventors: Takeshi Matsuo, Tokyo (JP); Shinichi Miyamoto, Tokyo (JP)

(73) Assignee: Mitsubishi Heavy Industries, Ltd, Tokyo (JP)

( * ) Notice: Subject to any disclaimer, the term of this patent is extended or adjusted under 35 U.S.C. 154(b) by 0 days.

(21) Appl. No.: 13/183,606

(22) Filed: Jul. 15, 2011

(65) Prior Publication Data
US 2012/0001438 A1  Jan. 5, 2012

Related U.S. Application Data

(63) Continuation of application No. PCT/JP2011/061779, filed on May 23, 2011.

(30) Foreign Application Priority Data

Jun. 30, 2010 (JP) ................................. 2010-149096

(51) Int. Cl.
*F03D 9/00* (2006.01)
(52) U.S. Cl. ............ 416/241 R; 416/241 A; 416/245 R; 415/2.1; 415/4.1; 415/4.3; 415/4.5; 415/200
(58) Field of Classification Search ............... 415/2.1, 415/4.1, 4.3, 4.5, 200; 416/241 R, 241 A, 416/345 R
See application file for complete search history.

(56) References Cited

U.S. PATENT DOCUMENTS

| 6,518,680 | B2 * | 2/2003 | McDavid, Jr. ................. 290/54 |
| 6,982,498 | B2 * | 1/2006 | Tharp ............................. 290/54 |
| 2001/0035651 | A1 | 11/2001 | Umemoto et al. |
| 2008/0128121 | A1 * | 6/2008 | Zhou ............................. 165/133 |
| 2010/0034658 | A1 | 2/2010 | Numajiri et al. |
| 2011/0143148 | A1 * | 6/2011 | Butts et al. .................... 428/447 |
| 2011/0215585 | A1 * | 9/2011 | Caires ............................ 290/55 |

FOREIGN PATENT DOCUMENTS

| JP | 2002013467 A | 1/2002 |
| JP | 2002-039051 A | 2/2002 |
| JP | 2006008930 A | 1/2006 |
| JP | 2006068294 A | 3/2006 |
| JP | 2006-335949 A | 12/2006 |
| JP | 2009002274 A | 1/2009 |
| JP | 2009191677 A | 8/2009 |

OTHER PUBLICATIONS

International Search Report for PCT/JP2011/061779, mailed Aug. 8, 2011.

* cited by examiner

*Primary Examiner* — Igor Kershteyn
(74) *Attorney, Agent, or Firm* — Kanesaka Berner and Partners LLP

(57) ABSTRACT

A wind power generator is provided in which a reduction in weight is achieved by reducing the wall thickness of a nacelle, and an increase in the amount of heat input to the interior of the nacelle from sunlight is suppressed. In a wind power generator in which driving/power-generating mechanisms linked to a rotor head to which wind-turbine blades are attached are accommodated and installed inside a nacelle, a coating of high-reflectivity paint is formed on at least part of the outer wall that receives sunlight.

6 Claims, 3 Drawing Sheets

WIND POWER GENERATOR

CROSS REFERENCE TO RELATED APPLICATIONS

This application is a continuation application of PCT/JP2011/061779 filed on May 23, 2011 and claims the benefit of Japanese Application No. 2010-149096 filed in Japan on Jun. 30, 2010, the entire contents of each of which are hereby incorporated by their reference.

TECHNICAL FIELD

The present invention relates to wind power generators that generate power by receiving wind force on wind-turbine blades and, in particular, relates to a technique for suppressing the amount of heat input to the interior of a nacelle of a wind power generator.

BACKGROUND ART

A wind power generator (hereinafter referred to as "wind turbine") is a device in which a rotor head equipped with wind-turbine blades rotates upon receiving wind force, and in which a generator driven by, for example, accelerating this rotation with a gear box generates electricity.

The above-described rotor head is attached at an end portion of a nacelle, which is installed on top of a wind turbine tower (hereinafter referred to as "tower") in a manner that allows yawing, and is supported so as to be rotatable about a substantially horizontal lateral rotation axis.

As a general device configuration, a device for transmitting a mechanical rotational force received from the wind-turbine blades and a power generator are installed inside the nacelle of the wind power generator. Among those, the rotational-force transmitting device is provided with a main bearing and a gear box, and the power generator is provided with a generator, a transformer, an inverter, and a control panel, or is provided with a generator and a control panel.

Such equipment in the nacelle is cooled by using outside air that is sucked in through a nacelle air inlet, performing heat exchange between the outside air and a coolant with individual heat exchangers, which are installed on each piece of equipment serving as a heat source, and supplying the coolant, whose heat has been absorbed by the outside air, to the equipment to be cooled. In this case, the outside air to be sucked into the nacelle is generally subjected to salt removal treatment and dust removal treatment through a filter.

As a conventional example employing heat exchange between the outside air and the coolant, specific examples of each piece of equipment releasing heat are illustrated in FIGS. 4A and 4B. In FIG. 4A, reference sign 1 in the figure designates a wind power generator, 2 designates a tower, 3 designates a nacelle, 4 designates a rotor head, 5 designates wind-turbine blades, 6 designates a nacelle air inlet, and 7 designates an air outlet.

In addition, FIG. 4B is an enlarged view of relevant portions of the wall surface structure of the nacelle 3. The nacelle wall surface of a general nacelle structure has an outside wall structure that is formed by connecting a plurality of separated wall members 3a, which are made of fiber reinforced plastic (hereinafter referred to as "FRP"), and a structure in which flange parts 3b provided inside the nacelle are connected with bolts and nuts 8 is employed.

With such a wind power generator 1, cooling of a main bearing 9 and a gear box 10, which constitute mechanical transmission devices, is achieved by using lubricating oil, which circulates through a lubricating oil circulatory system, as the coolant for heat exchange with the outside air. In this case, heat exchange between the lubricating oil and the outside air is performed in an oil cooler 11, and lubrication and cooling of frictional heat are achieved by supplying the lubricating oil that has been cooled due to the heat absorption with the outside air to rotating parts.

On the other hand, for cooling the electrical apparatuses that are heat releasing sources, for instance, in the case of an inverter control panel 12, antifreeze is used as the coolant for heat exchange with the outside air, and in the case of a generator 13, primary air is used as the coolant for heat exchange with the outside air. In both cases, continuous cooling is achieved by supplying and circulating the antifreeze or the primary air, which have been taken into the outside air, to electrical apparatuses that are heat sources to be cooled. Reference sign 14 in this figure designates a transformer.

The above-described outside air flows into the nacelle 3 through the nacelle air inlet 6 by operating a fan 15. This outside air flows within the nacelle 3 to exchange heat with various types of coolants, and to ventilate and cool the inside of the nacelle, and after that, the outside air flows out through the air outlet 7.

Because the wall members 3a of the nacelle 3 are made of FRP generally having a wall thickness of about 100 mm, the thermal insulance of the FRP becomes dominant. Therefore, the effect of neat input from sunlight can be effectively negligible in many cases.

PTL 1 below discloses a structure having a heat-shield-coating composition, and a film thereof, having high heat-shielding properties for preventing the intrusion of thermal energy by efficiently reflecting thermal energy such as sunlight.

In addition, in PTL 2, it is described that an ultraviolet-reflecting coating is applied to the blade surfaces of a wind turbine for preventing birds from accidentally colliding or coming into contact with the rotating wind-turbine blades.

CITATION LIST

Patent Literature

{PTL 1} Japanese Unexamined Patent Application, Publication No. 2006-335949
{PTL 2} Japanese Unexamined Patent Application, Publication No. 2002-39051

SUMMARY OF INVENTION

Technical Problem

To describe this more specifically, the solar constant (the amount of incoming solar energy per unit area incident on the surface of the earth's atmosphere perpendicularly) is about 1370 $W/m^2$, and thus, by assuming that the top and side surfaces of the nacelle form a substantially cuboid shape having a heat receiving area of 80 $m^2$ (nacelle height of 4 m, nacelle width of 4 m, and nacelle length of 5 m), the amount of heat input to the wall surfaces from the sun will be about 77 kW at an atmospheric transmittance of 0.7.

On the other hand, if the plate thickness of the wall member 3a of the above-described nacelle 3 made of FRP is reduced in order to reduce the weight, the amount of heat input to the interior of the nacelle from sunlight increases due to the reduction in thermal insulance. In particular, on a sunny day in summer, the air temperature inside the nacelle exceeds the maximum environmental temperature for the electronic equipment, which causes the lifetime of the electronic equipment to decrease.

That is, although reducing the plate thickness of the wall member 3a of the nacelle 3 in the wind power generator 1 decreases the heat-dissipation resistance and improves the heat-dissipation properties, at the same time, the input-heat resistance also decreases, and therefore, the amount of heat input to the interior of the nacelle from sunlight increases.

Thus, the input-heat resistance and heat-dissipation resistance of the wall member 3a are in an inverse relationship; however, with the current state of the art, it has been difficult to achieve a reduction in weight by reducing the plate thickness of the nacelle wall 3a, while at the same time suppressing the increase in the amount of heat input to the interior of the nacelle 3.

The present invention has been conceived in light of the circumstances described above, and an object thereof is to provide a wind power generator that can achieve reduced weight by reducing the wall thickness of the nacelle and that suppresses the increase in the amount of neat input to the interior of the nacelle from sunlight.

Solution to Problem

In order to solve the above problems, the present invention employs the following solutions.

A wind power generator according to a first aspect of the present invention is a wind power generator in which driving/power-generating mechanisms linked to a rotor head to which a wind-turbine blade is attached are accommodated and installed inside a nacelle, wherein a coating of high-reflectivity paint is formed on at least part of an outer wall that receives sunlight.

With such a wind power generator, because the coating of high-reflectivity paint is formed on at least part of the outer wall that receives sunlight, it is possible to reduce the input heat by selectively reflecting, with the coating of high-reflectivity paint, the near-infrared band, which contributes to heating.

The high-reflectivity paint is paint that is made highly reflective in the near-infrared band (780 nm to 2500 nm) in comparison with general paint, by mixing hollow ceramic beads, high-reflectivity pigment etc. therein, and it is used by applying it to a film thickness of about 100 to 150 μm on a surface where reflection is desired.

In the wind power generator according the first aspect of the present invention, the outer wall preferably includes a nacelle outer wall, a rotor head cover, and a tower wall; if the coating of high-reflectivity paint is formed on at least part of the outer wall in this way, it is possible to reduce the heat input to the inside of these from sunlight.

In the wind power generator according the first aspect of the present invention, at least one of the nacelle outer wall and the rotor head cover is preferably formed of fiber-reinforced plastic, and a layer of reflective material is preferably provided on a layer of the fiber-reinforced plastic; accordingly, the separate task of painting for applying the high-reflectivity paint is not required, and it is possible to reduce the heat input by selectively reflecting the near-infrared band, which contributes to heating. In this case, the layer of reflecting material is preferably formed on the inner side of a gel coating layer formed as a durable clear layer; accordingly, impairment of the reflective effect due to erosion etc. can be suppressed, which extends the lifetime.

A wind power generator according to a second aspect of the present invention is a wind power generator in which driving/power-generating mechanisms linked to a rotor head to which a wind-turbine blade is attached are accommodated and installed inside a nacelle, wherein a reflecting plate to which high-reflectivity paint is applied is attached to a nacelle outer wall that receives sunlight.

With such a wind power generator, because the reflecting plate on which the high-reflectivity paint is applied is attached to the nacelle outer wall that receives sunlight, at the nacelle outer wall that receives the most sunlight, the coating of high-reflectivity paint selectively reflects the near-infrared band, which contributes to heating, and the heat input can be suppressed. Such a reflecting plate is particularly advantageous as a countermeasure against input heat from sunlight, in existing wind power generators.

In the wind power generator according the second aspect of the present invention, the reflecting plate is preferably formed of fiber-reinforced plastic, and a layer of reflective material is preferably provided on a layer of the fiber reinforced plastic; accordingly, the separate task of painting for applying the high-reflectivity paint is not required, and the heat input can be suppressed by selectively reflecting the near-infrared band, which contributes to heating. In this case, the layer of reflecting material is preferably formed on the inner side of a gel coating layer formed as the durable clear layer; accordingly, impairment of the reflective effect due to erosion etc. can be suppressed, which extends the lifetime.

ADVANTAGEOUS EFFECTS OF INVENTION

With the present invention described above, it is possible to provide a wind power generator that achieves a reduction in weight by reducing the wall thickness of the nacelle and that suppresses the amount of heat input to the interior of the nacelle from sunlight. In other words, in a wall member, such as one made of fiber reinforced plastic, although the input-heat resistance and the heat-dissipation resistance are in an inverse relationship, the present invention realizes a reduction in the amount of heat input and an improvement in the heat dissipation properties by achieving a reduction in weight by reducing the plate thickness of the nacelle walls, while at the same time suppressing the increase in the amount of heat input to the interior of the nacelle by forming a coating of high-reflectivity paint or a sunlight-reflecting surface.

As a result, a rise in the air temperature inside the nacelle can be suppressed, and it is possible to prevent a reduction in lifetime of electronic equipment due to the air temperature inside the nacelle exceeding the maximum environmental temperature of the electronic equipment; therefore, a considerable advantage is obtained in terms of improvements to the reliability and durability of the wind power generator.

DESCRIPTION OF EMBODIMENTS

An embodiment of a wind power generator according to the present invention will be described below with reference to the drawings.

Figure 1A:
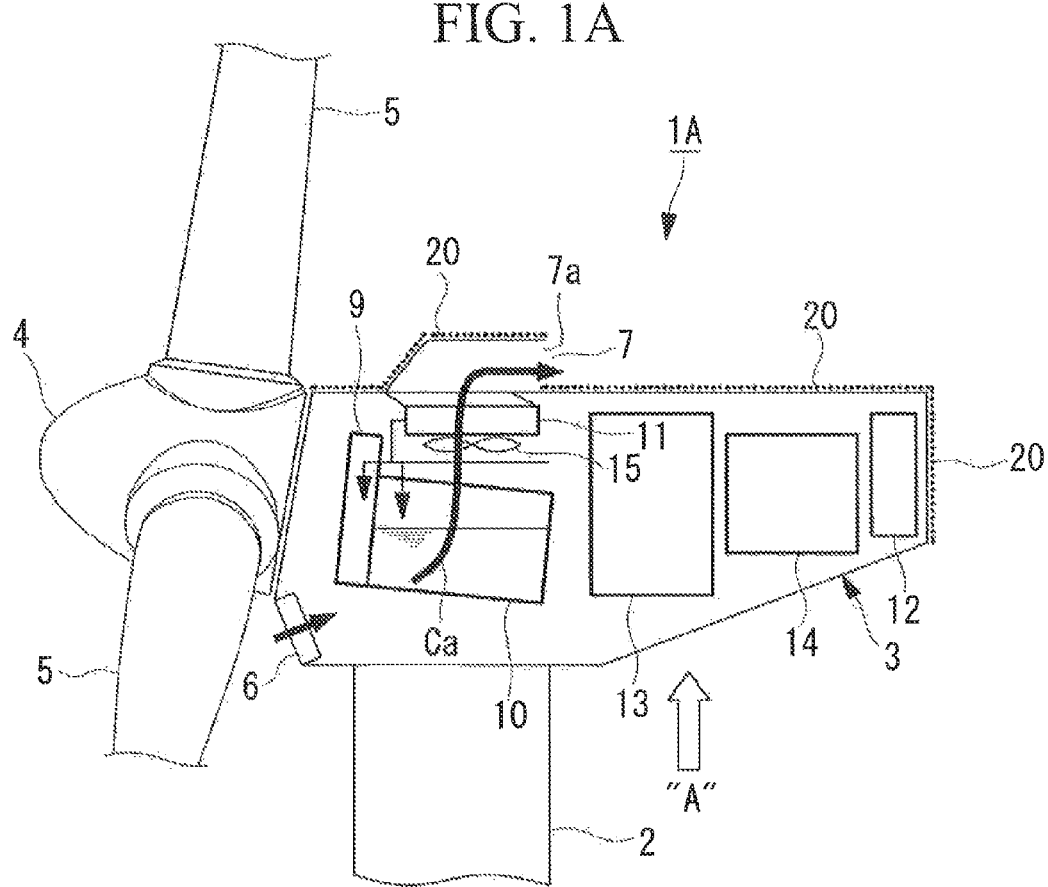
FIG. 1A is a diagram showing a first embodiment of a wind power generator according to the present invention, and is a cross-sectional view of relevant parts showing, in outline, an example configuration of the interior of a nacelle.
Figure 1B:
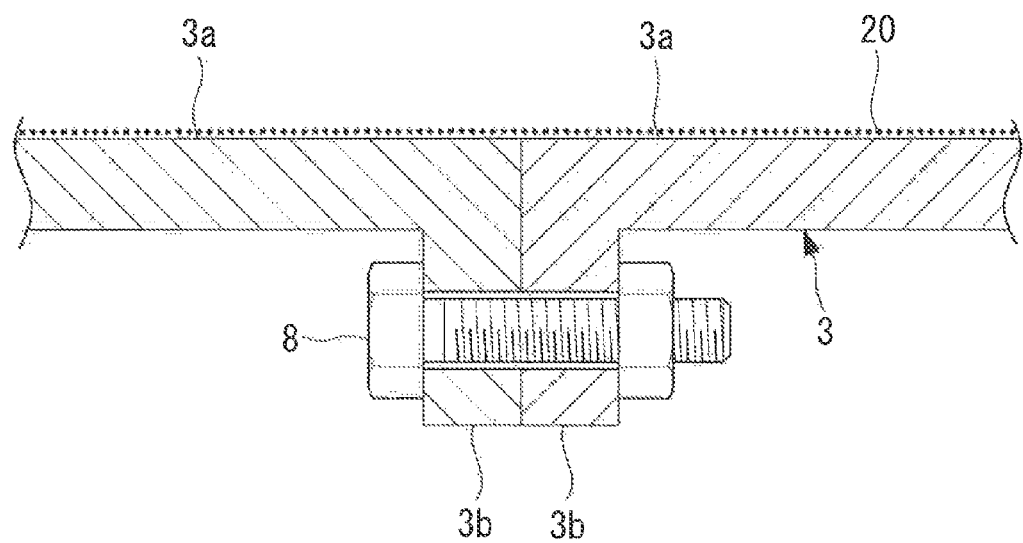
FIG. 1B is a diagram showing the first embodiment of the wind power generator according to the present invention, and is a cross-sectional view of the cross-sectional structure of a nacelle wall.

To begin with, a first embodiment will be described based on FIGS. 1A and 1B. In FIG. 1A, a wind power generator 1A includes a tower 2 erected upright on a base, a nacelle 3 provided at the top of the tower 2, and a rotor head 4 provided on the nacelle 3 in such a manner as to be capable of rotating about a substantially horizontal axis.

A plurality of (for example, three) wind-turbine blades 5 are attached to the rotor head 4 in a radiating pattern around a rotational axis thereof. Accordingly, the force of wind striking the wind-turbine blades 5 from the direction of the rotational axis of the rotor head 4 is converted into a motive force causing the rotor head 4 to rotate about, its rotational axis. Note that, although the illustrated wind power generator 1A is of a so-called upwind type in which the wind-turbine blades 5 rotate in front of the nacelle 3, the invention described below is not limited thereto and can also be applied, for example, to a downwind type.

A main bearing 9 and a gear box 10 are provided inside the nacelle 3 as a mechanical-driving-force transmission mechanism that transmits the rotation of the rotor head 4 to a generator 13.

Also, an inverter control panel 12, a transformer 14 that transforms the voltage of the electrical power generated by the generator 13, and so forth are also installed inside the nacelle 3 as various kinds of electrical equipment constituting a power-generating mechanism with the generator 13.

Thus, the wind power generator 1A is provided with driving/power-generating mechanisms linked to the rotor head 4 to which the wind turbine blades 5 are attached, which are accommodated and installed inside the nacelle 3. Such driving/power-generating mechanisms include equipment that generates heat when operating, and mechanical parts and electrical equipment whose environmental temperature is fixed.

The nacelle 3 is a hollow member having a substantially cuboid shape in which the periphery of a nacelle base plate and frame components, which are not shown, are covered with a wall member 3a. The wall member 3a is, for example, a plate-like member made of fiber-reinforced plastic (FRP), and this wall member 3a forms the outer wall of the nacelle 3.

A nacelle air inlet 6 formed in the wall member 3a is provided at the bottom of the front end face of the nacelle 3 for introducing outside air into the nacelle 3 for cooling. A filter having the functions of removing salt and dust is mounted in this nacelle air inlet 6. Also, an exhaust port 7, on which a rain guard 7a is mounted at an opening in the wall member 3a, is provided at the upper surface of the nacelle 3 for discharging the cooling outside air that has circulated inside the nacelle 3 into the atmosphere.

The outside air that is introduced through the nacelle air inlet 6 by operating a fan 15 is released into the atmosphere from the exhaust port 7, with its temperature increased after it is used in heat exchange with coolant that cools the heat-generating equipment installed inside the nacelle 3, as explained in the Background Art.

Note that the arrow Ca in the figure shows an example of the main flow of outside air, and the actual flow of outside air is made to flow by circulating inside the nacelle 3 depending on the placement of heat exchangers disposed inside the nacelle 3.

Thus, in the wind power generator 1A in which the driving/power-generating mechanisms linked to the rotor head 4, with the wind-turbine blades 5 attached thereto, are accommodated inside the nacelle 3, a coating 20 of high-reflectivity paint is formed on at least part of the outer wall that receives sunlight. In the example configuration shown in the figure, the coating 20 is formed on the outer surfaces at the top (including the outer surface of the rain guard 7a) and side faces (both side faces and the rear end face) of the nacelle 3.

The high-reflectivity paint is paint that is made highly reflective in the infrared region (780 nm to 2500 nm) compared with general paint by mixing hollow ceramic beads, high-reflectivity pigments, or the like therein. This high-reflectivity paint is used by applying it to a film thickness of approximately 100 to 150 μm to form the coating 20 on faces where it is desired to reflect sunlight.

The reflectivity of the high-reflectivity paint is generally about 0.8 to 0.9.

On the other hand, for a solar constant of approximately 1370 W/m$^2$, assuming that the heat-receiving area of the top and side faces of the substantially cuboid nacelle 3 is 80 m$^2$ (a nacelle height of 4 m, a nacelle width of 4 m, and a nacelle length of 5 m), when the atmospheric transmittance is 0.7, the amount of heat input to the walls of the nacelle from the sun is about 77 kW.

In such a case, by forming the coating 20 of high-reflectivity paint, the heat input to the interior of the nacelle 3 can be considerably reduced from 77 kW to about 8 to 16 kW. Therefore, it is not necessary to make the wall member 3a of the nacelle 3 thick to increase the input-heat resistance.

For example, if the thermal conductivity of the FRP used in the wall member 3a of the nacelle 3 is assumed to be 0.3 W/mK, and the thickness of the wall member 3a is assumed to be 10 cm, the thermal insulance is 3 W/m$^2$K. After applying the high-reflectivity paint, the amount of heat input from sunlight is reduced to about $\frac{1}{10}$ to $\frac{1}{5}$, and therefore, for the same thermal insulance, a thickness of about 1 to 2 cm for the wall portion 3a is sufficient. Accordingly, by reducing the thickness of the wall portion 3a in this way, the weight of the walls of the nacelle 3 is reduced, and costs can be lowered.

A sufficient reduction in the amount of heat input can be achieved even if this coating 20 is formed only on the top outer surface of the nacelle 3, which tends to receive the most solar heat.

Thus, the above-described coating 20 of high-reflectivity paint is not limited to the entire outer wall surface (top surface, both side surfaces, and rear surface) of the nacelle 3 which receives sunlight; it may be formed on only the top surface or the side surfaces. In other words, so long as the coating 20 of high-reflectivity paint is formed on at least part of the outer walls of the nacelle 3, a reduction in the amount of heat input can be achieved.

Also, the above-described coating 20 of high-reflectivity paint is not limited to the outer walls of the nacelle 3; the amount of heat input may be reduced by forming it on other outer walls that receive sunlight, for example, the cover of the rotor head 4 or the wall of the tower 2. In this way, so long as the coating 20 of high-reflectivity paint is formed on at least part of the outer walls that have a portion connected with the nacelle 3, it is possible to reduce the heat input to the interior of the nacelle 3 from sunlight.

With this wind power generator 1A, because the coating 20 of high-reflectivity paint is formed on at least part of the outer walls that receive sunlight, with the coating of high-reflectivity paint, it is possible to selectively reflect only the near-infrared band, which contributes to heating, thus reducing the heat input.

Therefore, a reduction in weight can be achieved by reducing the wall thickness of the nacelle 3, and it is also possible to reduce the amount of heat input to the interior of the nacelle 3 from sunlight.

In other words, in the wall member 3a, such as one made of FRP, although the input-heat resistance and heat-dissipation resistance are in an inverse relationship, by forming the above-described coating 20, a reduction in weight and an improvement in heat-dissipation can be achieved by reducing the plate thickness of the nacelle wall 3a, and at the same time, forming the coating 20 of high-reflectivity paint can suppress an increase in the amount of neat input to the interior of the nacelle 3, to realize a reduction in the amount of heat input.

As a result, a rise in the nacelle internal air temperature of the nacelle 3 can be suppressed, making it possible to prevent a reduction in the lifetime of electrical equipment due to the nacelle internal air temperature exceeding the maximum environmental temperature of the electrical equipment, and therefore, the reliability and durability of the wind power generator 1A are improved.

Next, a second embodiment of a wind power generator according to the present invention will be described based on FIG. 2. Parts that are identical to those in the embodiment described above are assigned the same reference numerals, and a detailed description thereof is omitted.

Figure 2:
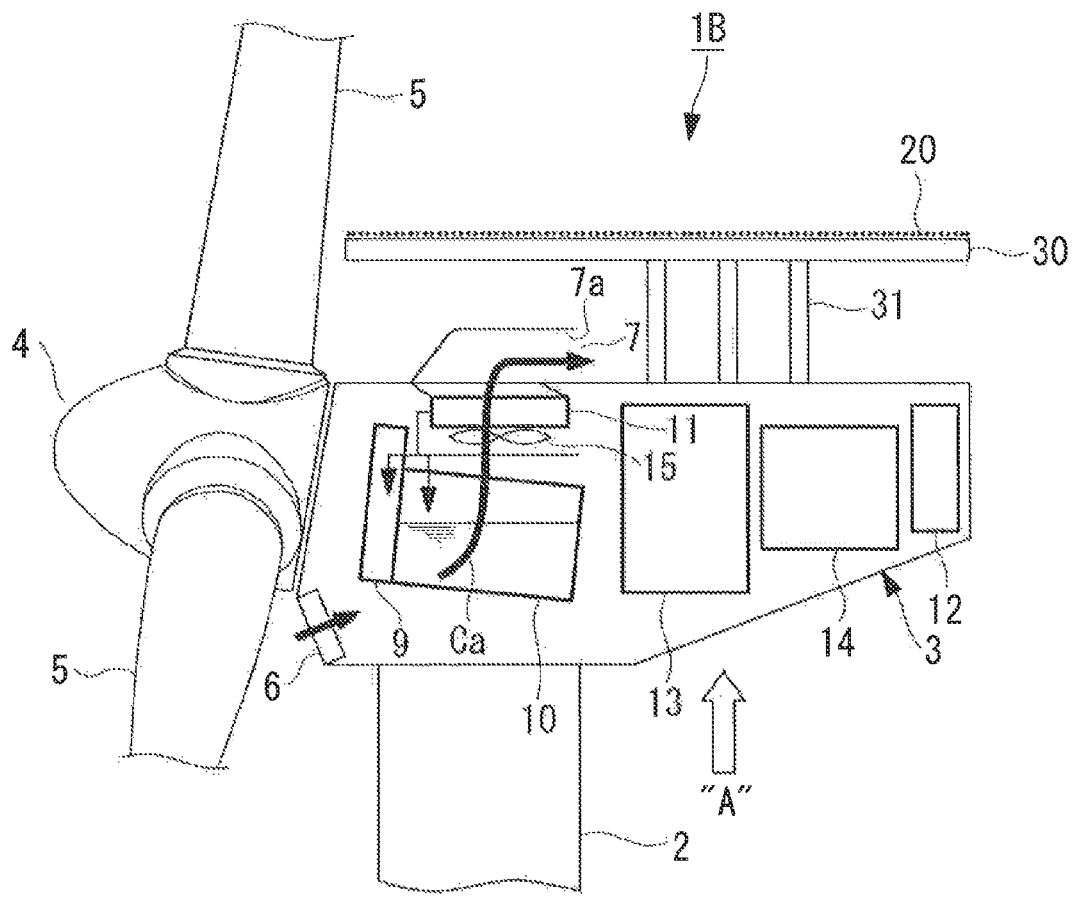
FIG. 2 is a diagram showing a second embodiment of a wind power generator according to the present invention, and is a cross-sectional view of relevant parts showing, in outline, an example configuration of the interior of a nacelle.

In a nacelle 3 of a wind power generator 1B shown in FIG. 2, a reflecting plate 30 coated with high-reflectivity paint on the top surface thereof is attached to the top portion of the nacelle outer wall, which receives sunlight, with a support member 31. This reflecting plate 30 is attached away from the upper surface with the support member 31 so as not to disturb the flow of nacelle internal air which flows out from the exhaust port 7.

A coating 20 formed by applying the same high-reflectivity paint as in the above embodiment is provided on the upper surface of the reflecting plate 30.

With this wind power generator 1B, because the reflecting plate 30 having the coating 20 formed thereon is attached to the top portion of the nacelle 3 which tends to receive the most sunlight, at the top portion of the outer walls of the nacelle 3, the coating 20 of high-reflectivity paint can selectively reflect the near-infrared band, which contributes to heating, thus reducing the heat input.

Attaching this reflecting plate 30 is beneficial in terms of safety and construction costs compared with performing painting at high places, as with an existing wind power generator 1B. In other words, when the reflecting plate is attached to an existing nacelle 3, because application of the high-reflectivity paint is performed above the ground, the only high work that needs to be performed is installation work. Therefore, the reflecting plate 30 of this embodiment is particularly beneficial as a measure against heat input from sunlight in an existing wind power generator 1B.

Note that, although the wind power generator 1B shown in the figure does not have the coating 20 of high-reflectivity paint on surfaces other than the upper surface of the reflecting plate 30, the coating 20 may be formed on the side surfaces etc. of the nacelle 3 as required.

In the first and second embodiments described above, although the coating 20 of high-reflectivity paint is formed on the outer walls etc. of the nacelle 3, instead of high-reflectivity paint, a sunlight-reflecting surface described below may be formed.

Figure 3:
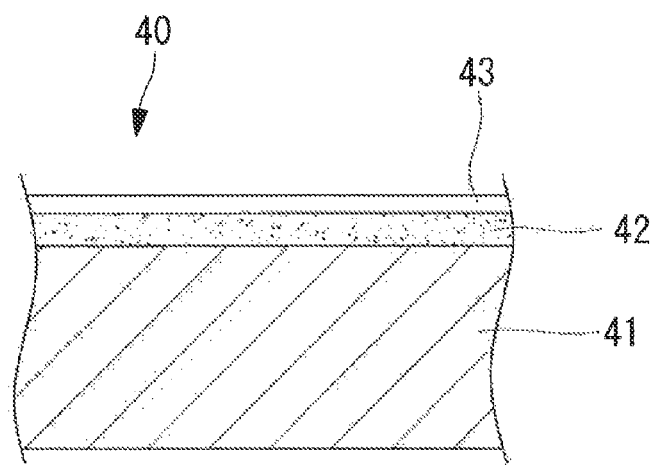
FIG. 3 is a cross sectional view of a layered structure, showing a sunlight-reflecting surface formed on the surface of fiber-reinforced plastic (FRP).
Figure 4A:
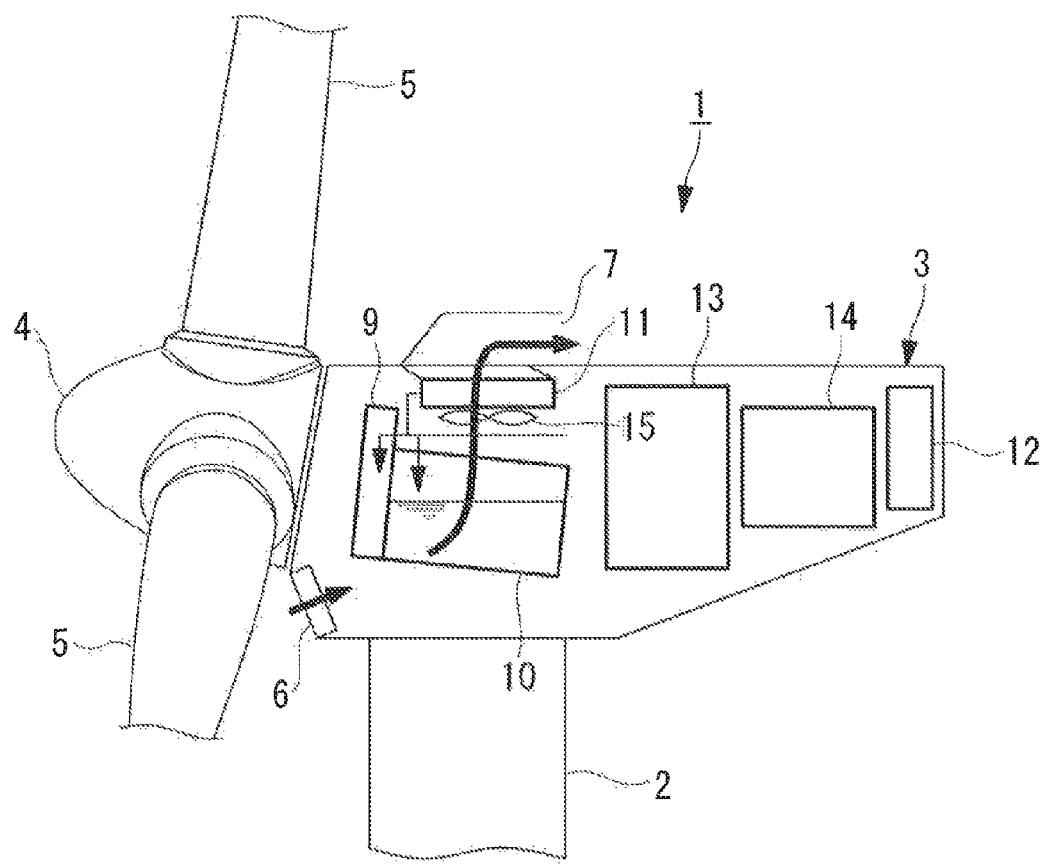
FIG. 4A is a diagram showing a conventional structure of a wind power generator, and is a cross-sectional view of relevant parts showing, in outline, an example configuration of the interior of a nacelle.
Figure 4B:
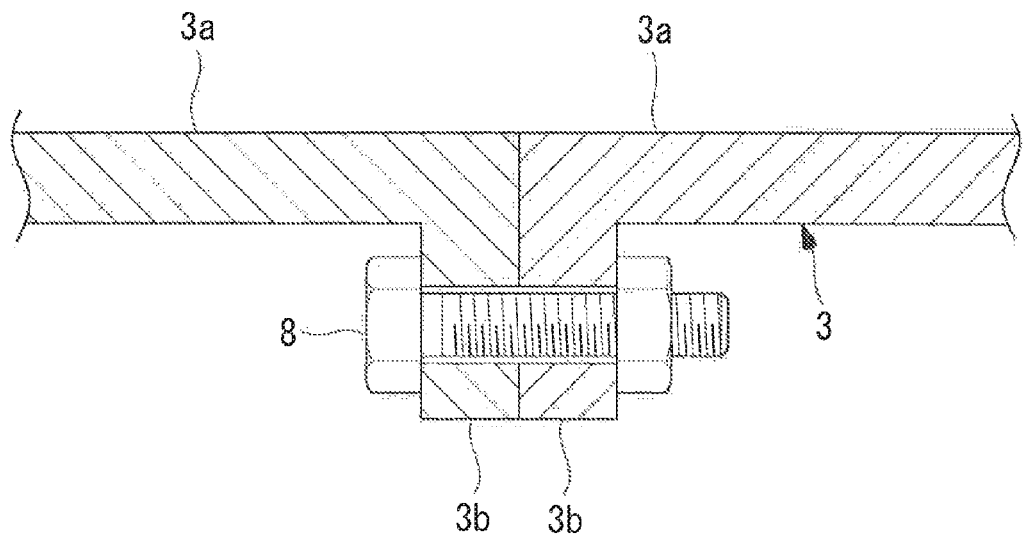
FIG. 4B is a diagram showing a conventional structure of a wind power generator, and is a cross-sectional view snowing the cross-sectional structure of a nacelle wall.

FIG. 3 is cross-sectional diagram of a layered structure showing a sunlight-reflecting surface 40 formed on the surface of FRP. In this case, the outer walls etc. of the nacelle are assumed to be made of FRP, and a reflecting surface 40 that reflects sunlight is formed on the outer surfaces thereof.

The reflecting surface 40 has a ceramic beads layer 42 and a clear layer 43 formed on the surface of FRP 41. That is, the ceramic beads layer 42, in which is distributed a reflective material such as hollow ceramic beads that suppress input heat by selectively reflecting the near-infrared band that contributes to heating, is provided between the outer surface of the FRP 41 and the clear layer 43, forming the reflecting surface 40 that reflects sunlight.

When this reflecting surface 40 is fabricated by forming FRP 41, which serves as the outer wall of the nacelle 3 and the reflecting plate 30, formation of the reflecting surface 40 can be performed at the same time as fabricating the FRP 41. Therefore, the separate task of performing painting work for applying the high-reflectivity paint is not necessary, and the reflecting surface 40 can be formed integrally on the surfaces of members made of the FRP 41.

Because this surface layer 40 is formed with the ceramic beads layer 42, which is reflective material, at the inner side of a gel coating layer formed to serve as the durable clear layer 43, impairment of the reflective effect due to erosion etc. can be suppressed, which extends the lifetime.

However, if cost reduction has priority, the clear layer is not absolutely essential. Also, the reflecting surface 40 may be formed by mixing a high-reflectivity pigment etc. therein, not just ceramic beads.

Accordingly, with the wind, power generators 1A and 1B of the above-described embodiments, the weight can be reduced by reducing the wall thickness of the nacelle 3, and an increase in the amount of heat input to the interior of the nacelle can be suppressed.

Note that the present invention is not limited to the embodiments described above, and suitable modifications are permitted, so long as they do not depart from the spirit of the invention.

[Reference Signs List]
1A, 1B wind power generator
3 nacelle
4 rotor head
5 wind-turbine blade
20 coating
30 reflecting plate
40 reflecting surface

The invention claimed is:
1. A wind power generator in which driving/power-generating mechanisms linked to a rotor head to which a wind-turbine blade is attached are accommodated and installed inside a nacelle, wherein
a coating of high-reflectivity paint having a thickness of 100 to 150 μm is formed on at least part of an outer wall that adapted to receiver sunlight, and
hollow ceramic beads or a high-reflectivity pigment is mixed in the high-reflectively paint to raise a reflectivity of the high-reflectivity paint in a near-infrared region of 780 nm to 2500 nm.

2. A wind power generator according to claim 1, wherein the outer wall includes a nacelle outer wall, a rotor head cover, and a tower wall.

3. A wind power generator according to claim 1, wherein at least one of the nacelle outer wall and the rotor head cover is formed of fiber-reinforced plastic, and a layer of reflective material is provided on a layer of the fiber-reinforced plastic.

4. A wind power generator in which driving/power-generating mechanisms linked to a rotor head to which a wind-turbine blade is attached are accommodated and installed inside a nacelle,
wherein a reflecting plate to which high-reflectivity paint is applied is attached to a top portion of a nacelle outer wall that adapted to receiver sunlight so that the reflecting plate is away from the top portion of the nacelle outer wall.

5. A wind power generator according to claim 4, wherein the reflecting plate is formed of fiber-reinforced plastic, and a layer of reflective material is provided on a layer of the fiber reinforced plastic.

6. A wind power generator in which driving/power-generating mechanisms linked to a rotor head to which a wind-turbine blade is attached are accommodated and installed inside a nacelle,
wherein
at least part of an outer wall that adapted to receive sunlight is formed of fiber-reinforced plastic on which a reflecting surface is integrally formed, and
the reflecting surface includes a reflective layer in which is distributed hollow ceramic beads or a high-reflectivity pigment that suppresses input heat by selectively reflecting sunlight in an near-infrared region of 780 nm to 2500 nm.

* * * * *